(12) United States Patent
Cook

(10) Patent No.: US 11,660,995 B2
(45) Date of Patent: May 30, 2023

(54) CUPHOLDER AND ADAPTER FOR LARGE CONTAINERS DURING VEHICLE USE

(71) Applicant: Benjamin Cook, Lincoln, CA (US)

(72) Inventor: Benjamin Cook, Lincoln, CA (US)

(*) Notice: Subject to any disclaimer, the term of this patent is extended or adjusted under 35 U.S.C. 154(b) by 0 days.

(21) Appl. No.: 17/592,418

(22) Filed: Feb. 3, 2022

(65) Prior Publication Data

US 2022/0250524 A1  Aug. 11, 2022

Related U.S. Application Data

(60) Provisional application No. 63/146,581, filed on Feb. 6, 2021.

(51) Int. Cl.
*B60N 3/10* (2006.01)

(52) U.S. Cl.
CPC ............. *B60N 3/103* (2013.01); *B60N 3/105* (2013.01)

(58) Field of Classification Search
CPC ................................. B60N 3/103; B60N 3/105
USPC ......................................................... 224/544
See application file for complete search history.

(56) References Cited

U.S. PATENT DOCUMENTS

| | | | | |
|---|---|---|---|---|
| 4,854,468 A * | 8/1989 | Dahlquist, II | ......... | B60N 3/103 248/346.11 |
| 5,285,953 A * | 2/1994 | Smith | ................ | A47G 23/0216 220/737 |
| 5,330,145 A * | 7/1994 | Evans | .................... | B60N 3/107 224/547 |
| 5,655,742 A * | 8/1997 | Whitman | ............... | B60N 3/103 248/311.2 |
| 5,676,340 A * | 10/1997 | Ruhnau | .................. | B60N 3/103 248/314 |
| 10,562,430 B1 * | 2/2020 | Veillon | .................. | B60N 3/103 |
| 11,254,253 B1 * | 2/2022 | Fan | ........................ | B60N 3/106 |
| 11,447,053 B1 * | 9/2022 | Fan | ........................ | B60N 3/106 |
| 2017/0108269 A1 * | 4/2017 | Shin | ........................ | F25B 21/02 |

* cited by examiner

*Primary Examiner* — Nathan J Newhouse
*Assistant Examiner* — Lester L Vanterpool
(74) *Attorney, Agent, or Firm* — My Patent Guys; Christopher Pilling

(57) ABSTRACT

A cupholder adapter configured for use with an existing cupholder on a vehicle is provided. The cupholder adapter includes a cylindrical cupholder having a hollow internal volume, a collar attached to a top portion of the cylindrical cupholder, wherein the collar includes a plurality of tabs extending perpendicularly into the hollow internal volume, and an adapter base coupled to the cylindrical cupholder, wherein the adapter base includes a plurality of legs configured to expand and retract such that the diameter of the adapter base is configured to expand from a minimum diameter to a maximum diameter. The plurality of tabs includes tabs of different lengths and widths which enables and accommodates wide, tall, and narrow beverage containers during vehicle use. The adapter base is configured to install into the recessed cupholder near the console of most vehicles.

7 Claims, 16 Drawing Sheets

CUPHOLDER AND ADAPTER FOR LARGE CONTAINERS DURING VEHICLE USE

CROSS-REFERENCE TO RELATED APPLICATIONS

The present application claims priority to provisional application 63/146,581, filed on Feb. 6, 2021, the disclosure of which is hereby incorporated in its entirety at least by reference.

BACKGROUND OF THE INVENTION

1. Field of the Invention

The present invention relates generally to cupholders but more particularly to a cupholder and adapter for large containers during vehicle use.

2. Description of Related Art

Cupholders provided by most motor vehicles are recessed into a center console area or dashboard area of the vehicle. The cupholders are several inches in diameter and fully accommodate narrow and short containers such as disposable cardboard beverage cups and standard carbonated soda cans. Taller or wider containers either cannot fit at all or fit in a manner wherein the container may tip over or rattle about. Such problems may lead to spillage and potential danger to the vehicle and its occupants. Consequently, a cupholder and adapter for large containers during vehicle use is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a cupholder adapter configured for use with an existing cupholder on a vehicle is provided, the cupholder adapter comprising a cylindrical cupholder having a hollow internal volume; a collar attached to a top portion of the cylindrical cupholder, wherein the collar includes a plurality of tabs extending perpendicularly into the hollow internal volume; an adapter base coupled to the cylindrical cupholder, wherein the adapter base includes a plurality of legs configured to expand and retract such that the diameter of the adapter base is configured to expand from a minimum diameter to a maximum diameter.

In one embodiment, the plurality of legs are configured to expand and retract via rotation of the cupholder. In one embodiment, the cylindrical cupholder is configured to be coupled to the adapter base in a variety of configurations including at least (a) the cylindrical cupholder's axis is aligned with the adapter base's axis; and (b) the cylindrical cupholder's axis is not aligned with the adapter base's axis. In another embodiment, an attachment member positioned on a bottom surface of the cylindrical cupholder is provided, wherein the attachment member enables the coupling of the adapter base and the cylindrical cupholder via a mounting spacer attached to the adapter base. In one embodiment, the attachment member comprises a number of mounting holes and the mounting spacer comprises a number of protrusions including a central protrusion having a hole, wherein a mounting hole of the number of mounting holes is configured to align with the central protrusion such that a fastener can extend through the mounting hole and the hole of the central protrusion. In another embodiment, the number of mounting holes of the attachment member enables multiple configuration of the cylindrical cupholder in relation to the adapter base including an aligned configuration and off-set configuration. In one embodiment, at least one spacer positioned between the cylindrical cupholder and the adapter base is provided. In one embodiment, a screw gear is provided to enable the movement of the plurality of legs via rotation. In one embodiment, the minimum diameter is approximately 2.6 inches and the maximum diameter is approximately 3.8 inches. In one embodiment, the plurality of tabs comprises tabs of varying length and width.

In another aspect of the invention, a cupholder adapter configured for use with an existing cupholder on a vehicle is provided, the cupholder adapter comprising a cylindrical cupholder having a hollow internal volume; an adapter base coupled to the cylindrical cupholder, wherein the adapter base includes a plurality of legs configured to expand and retract such that the diameter of the adapter base is configured to expand from a minimum diameter to a maximum diameter.

In yet another aspect of the present invention, a cupholder adapter configured for use with an existing cupholder on a vehicle is provided, the cupholder adapter comprising a cylindrical cupholder having a hollow internal volume; an adapter base coupled to the cylindrical cupholder; and, wherein the cylindrical cupholder is configured to be coupled to the adapter in at least two configurations: (a) the cylindrical cupholder's axis is aligned with the adapter base's axis; and, (b) the cylindrical cupholder's axis is not aligned with the adapter base's axis.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a cupholder and adapter for large containers during vehicle use.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about," "generally," or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 1:
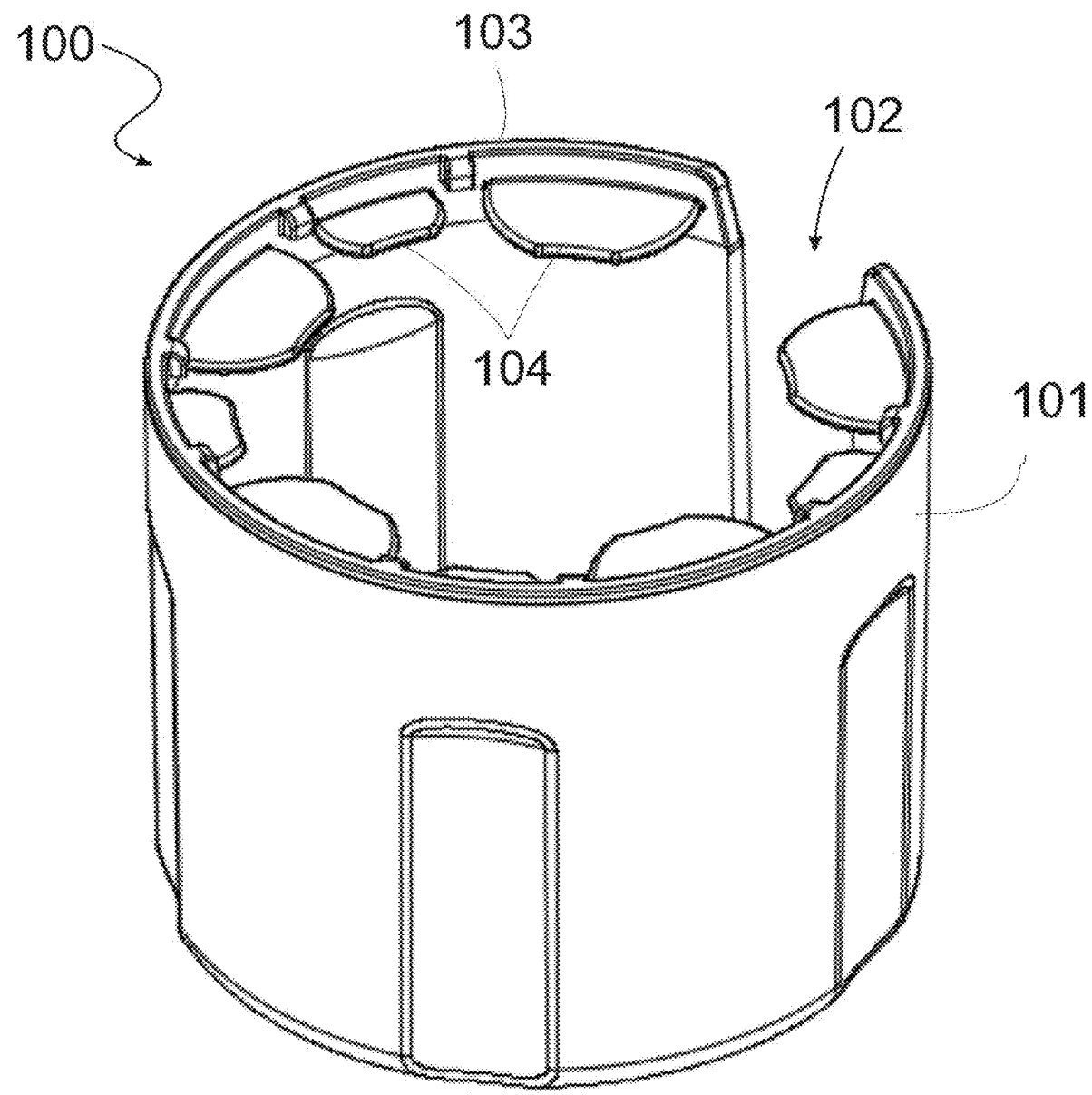
FIG. 1 is a perspective view of a cupholder according to an embodiment of the invention.
Figure 2:
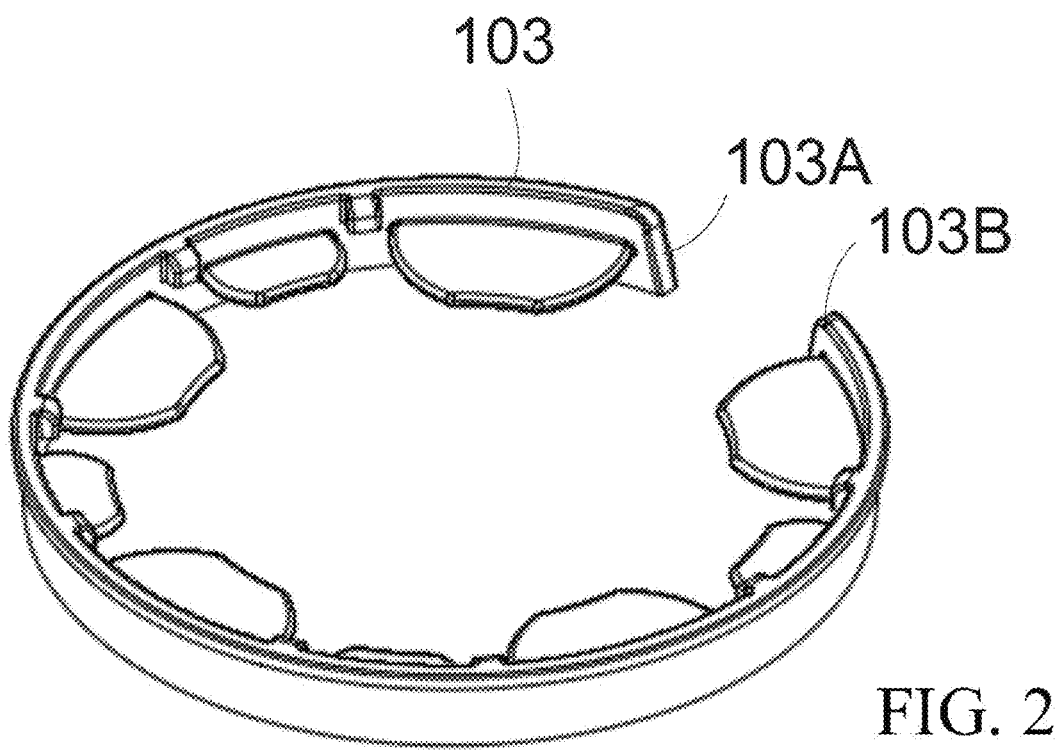
FIG. 2 is a perspective view of the collar of the cupholder of FIG. 1.
Figure 3:
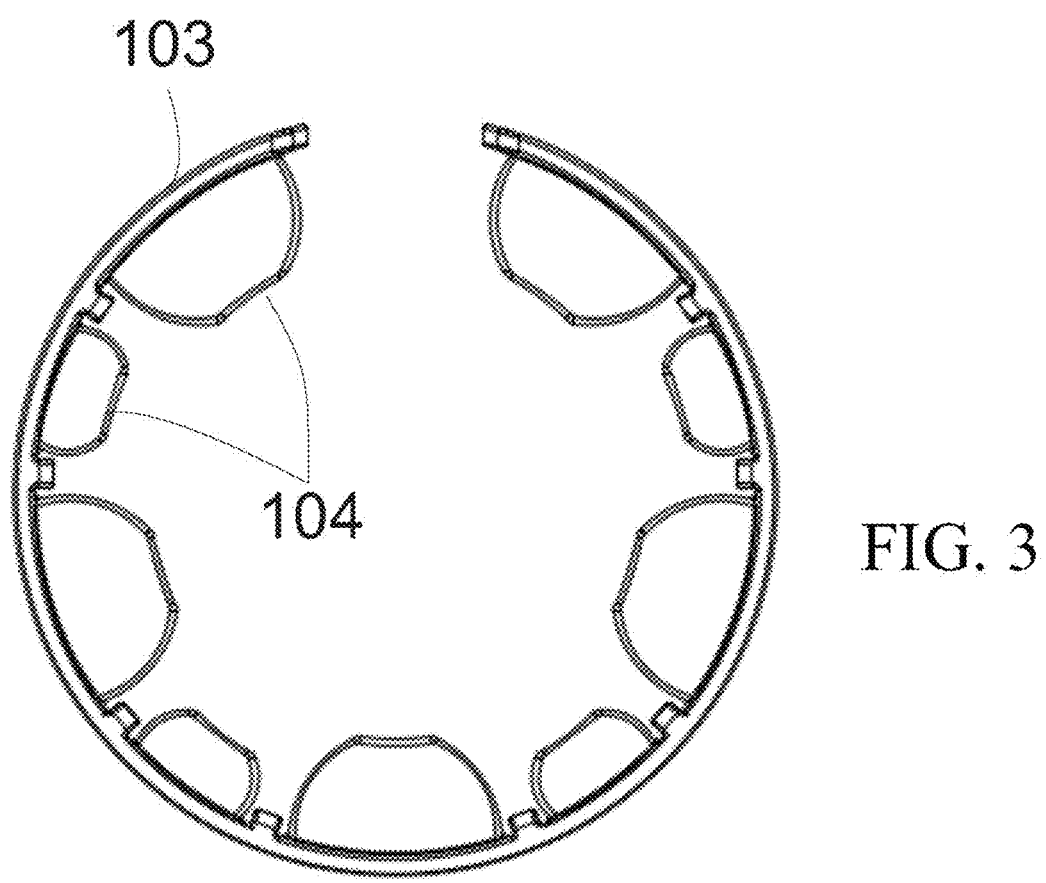
FIG. 3 is a top view of FIG. 2.

Referring now to accompanying FIGS. 1-3, a cupholder 100 of the present invention is illustrated. In one embodiment, the cupholder 100 comprises a generally cylindrical housing 101 having a gap 102 enabling the use of beverage containers having handles to be used. In one embodiment, the cupholder 100 includes a collar 103 having a plurality of tabs 104, wherein the plurality of tabs 104 are of differing sizes and lengths. The plurality of tabs of differing lengths and widths are attached at the top of the cupholder via the collar and point horizontally inward toward the center area of the cupholder. Advantageously, as the tabs are of varying lengths, they are configured to promote stabilization of beverage containers, such as travel cups, water bottles, juice bottles, and carbonated beverage cans of varying widths. The shorter tabs are configured to stabilize cups and cans that are relatively wide. By contrast, the adjacent tabs that are long and extend further inward stabilize containers that are narrow and that might otherwise tip or rattle about while the vehicle is in motion.

Further, the tabs are sufficiently wide to hold large and wide containers that may be too wide to fit in the standard cupholder provided by many motor vehicles. With its width and the aforementioned tabs of varying lengths along with an adapter base that is configured to fit into the cupholder of most vehicles, the cupholder provided herein can accommodate many wide containers and hold them steady as a vehicle rounds corners and encounters rough surfaces. This will be discussed in greater details below.

In one embodiment, the cupholder 100 is configured to hold containers up to approximately 3.85" in diameter, as well as containers down to approximately 2.8" in diameter. In addition, the cupholder provides better support for tapered bottles.

In one embodiment, the plurality of tabs 104 are constructed from a thin, flexible material, such that they may bend fairly easily when a bottle is inserted. In one embodiment, the tabs are constructed of rubber. Otherwise, it would be difficult to insert or remove the bottle. The majority of rubber tabs/flaps in the prior art protrude in a perpendicular manner and are bent down when a bottle is inserted. However, if the tabs remain unbent, and can stay perpendicular to the side of the container, it provides significantly more support for the container and help prevent tipping even when the host vehicle may be turning or braking hard. Thus, the tabs of the present invention are configured to remain unbent and remain perpendicular to the side of the container during use. In one embodiment, the plurality of tabs include a large tab and a small tab, wherein the large tab is approximately 31 mm wide and 16 mm long (at the longest point where the tab extends toward center area of the cupholder) and the small tab is approximately 19 mm wide and 9.5 mm long. In one embodiment, the thickness of the plurality of tabs is approximately 1.75 mm.

Advantageously, with multiple length tabs, the cupholder 100 is configured to be used with almost any size bottle without having to make adjustments. The size of the bottle will determine which tabs stay perpendicular and which tabs bend. In some instances, some bottles may end up slightly off-center and a combination of some of the large tabs and some small tabs will stay perpendicular and provide support.

Figure 4:
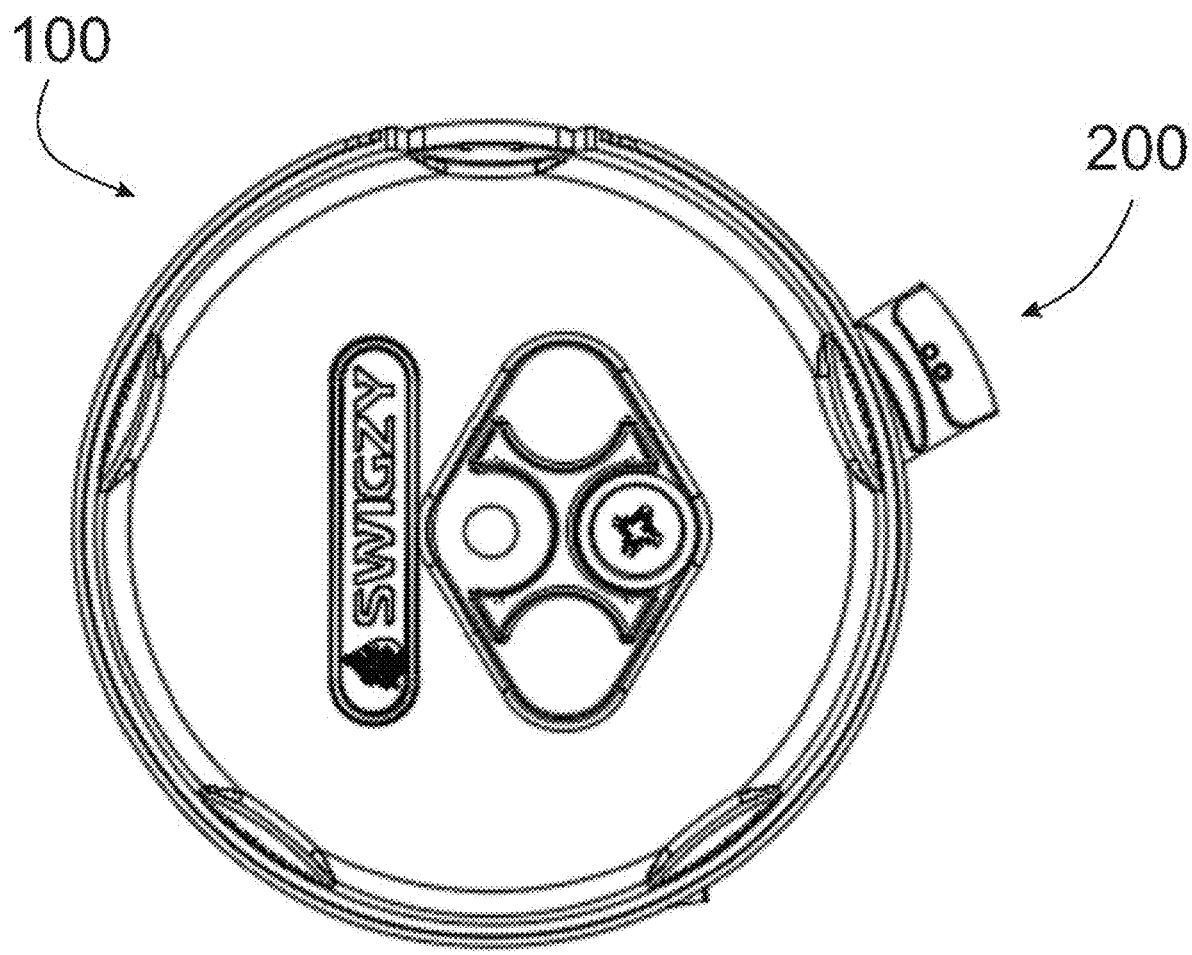
FIG. 4 is a top view of the cupholder mounted off-center from the adapter according to an embodiment of the present invention.
Figure 5:
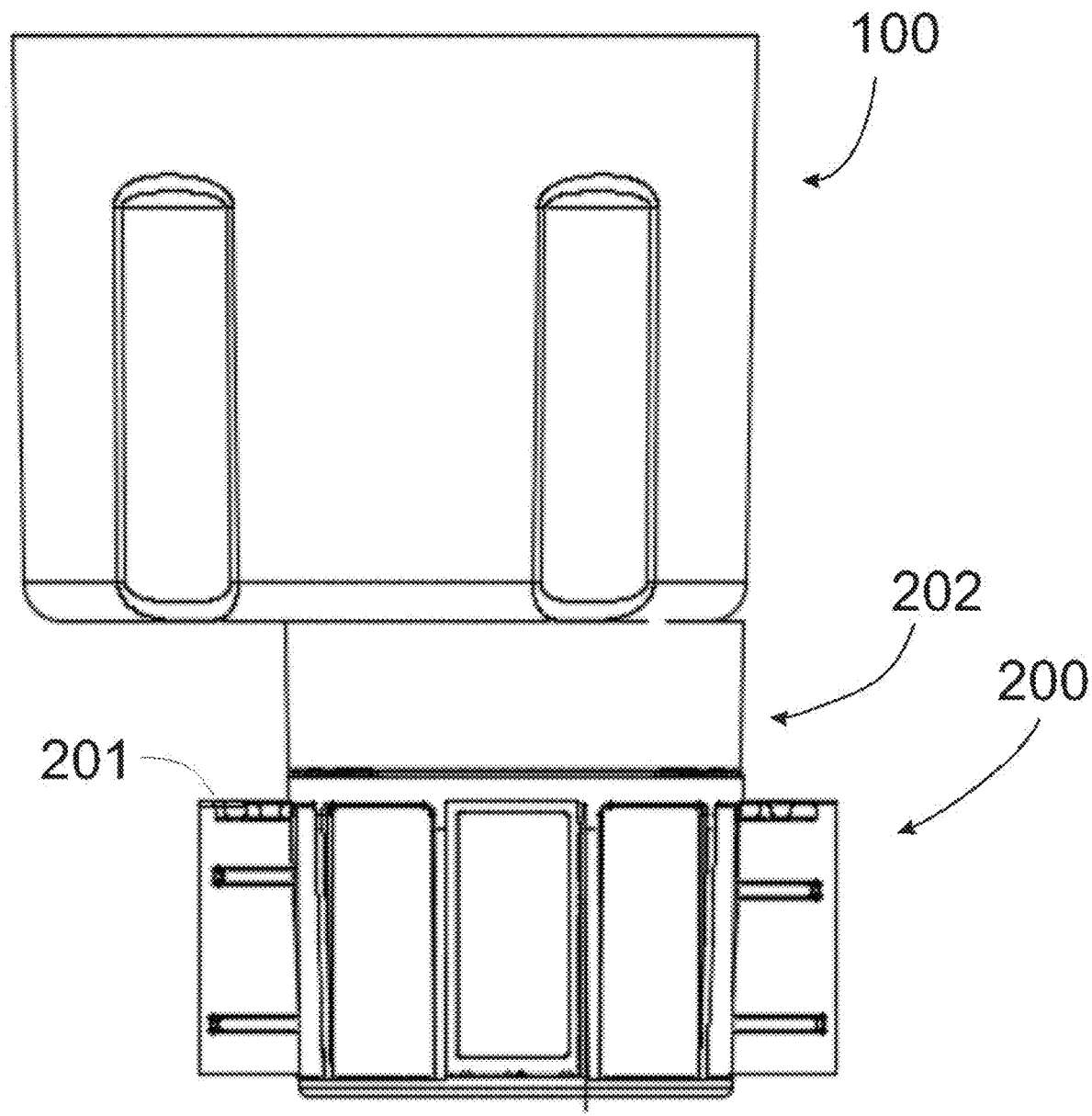
FIG. 5 is a side view of FIG. 4.

Referring now to FIGS. 4-5, the cupholder 100 is shown attached to an adapter 200, wherein the attachment is offset. The adapter 200 is configured to act as the base for the cupholder 100. Advantageously, the adapter 200 acts as a base having extendable and retractable leg members 201 enabling the adapter to fit into the existing cupholder of the hosting vehicle (such as the cupholders shown in FIGS. 20 and 21). The adapter 200 may be manipulated to tighten (via extending the leg members 201) within the cupholder of the vehicle and provide stability. This will be discussed in further details below. In one embodiment, a spacer 202 is positioned between the adapter 200 and cupholder 100. The spacer 202 enables the cupholder 100 to be free of an existing cupholder's dimensions. In some embodiments, more than one spacer may be used. This will be discussed in further details below.

Figure 6:
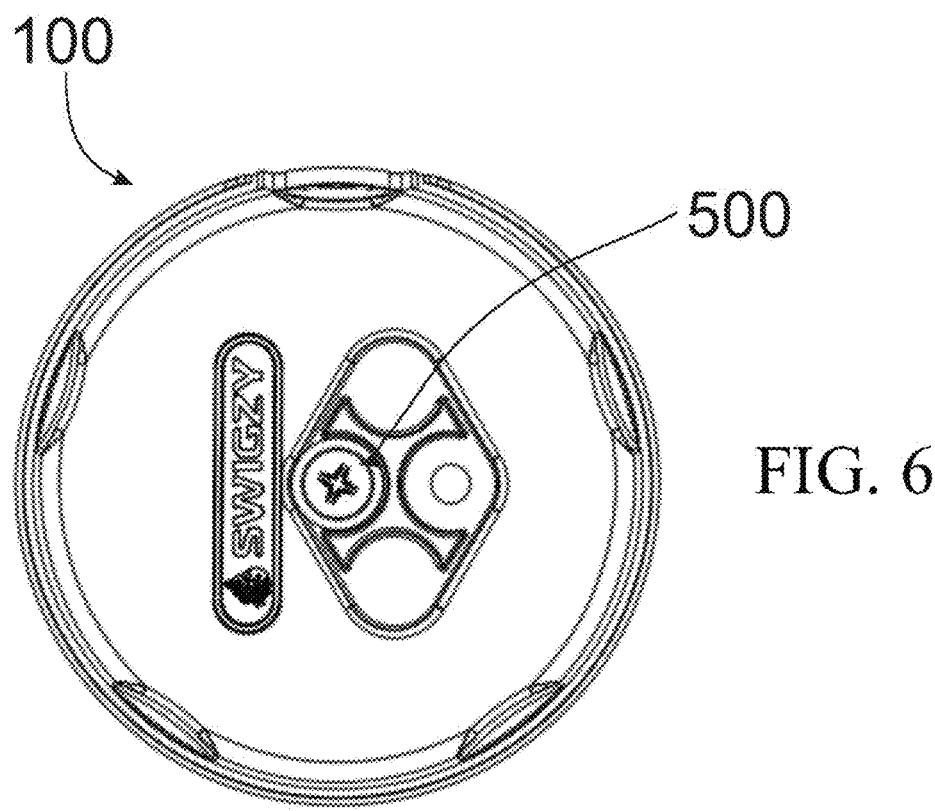
FIG. 6 is a top view of the cupholder mounted in the center of the adapter according to an embodiment of the present invention.
Figure 7:
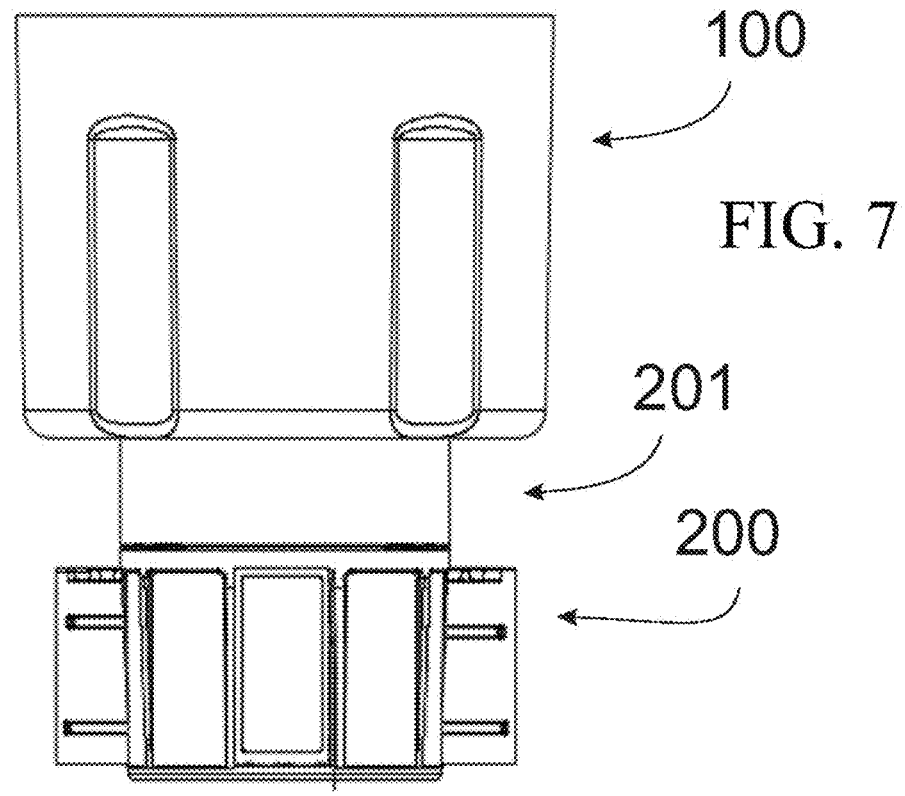
FIG. 7 is a side view of FIG. 6.
Figure 8:
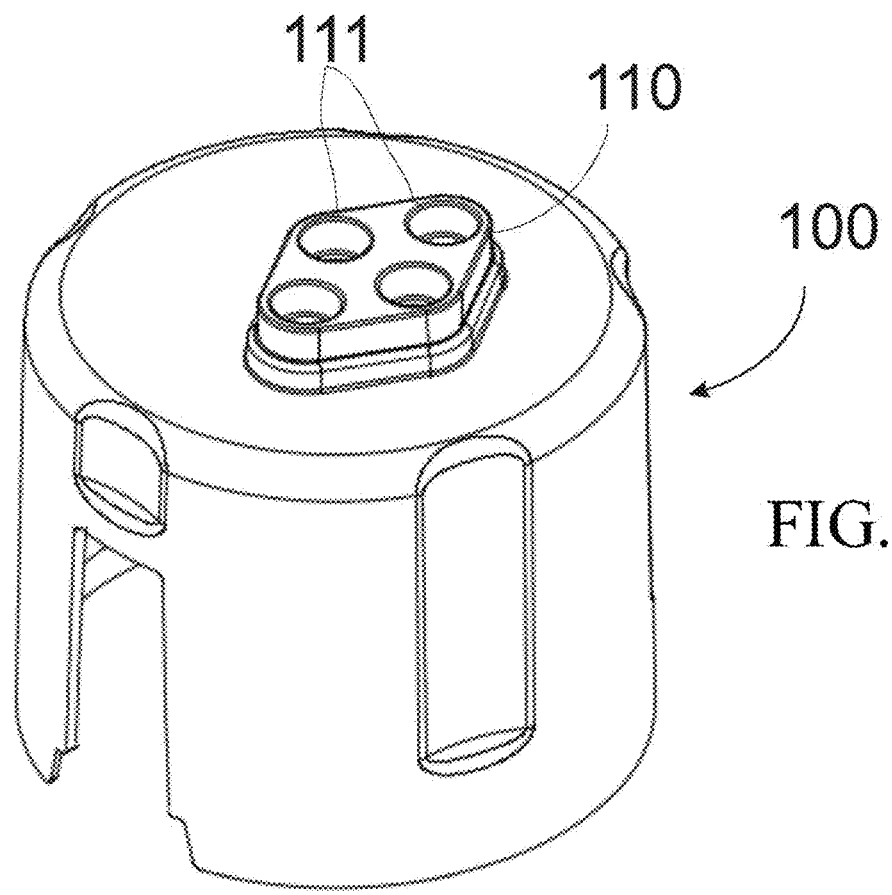
FIG. 8 is a perspective bottom view of the cupholder showing the attachment member according to an embodiment of the present invention.
Figure 9:
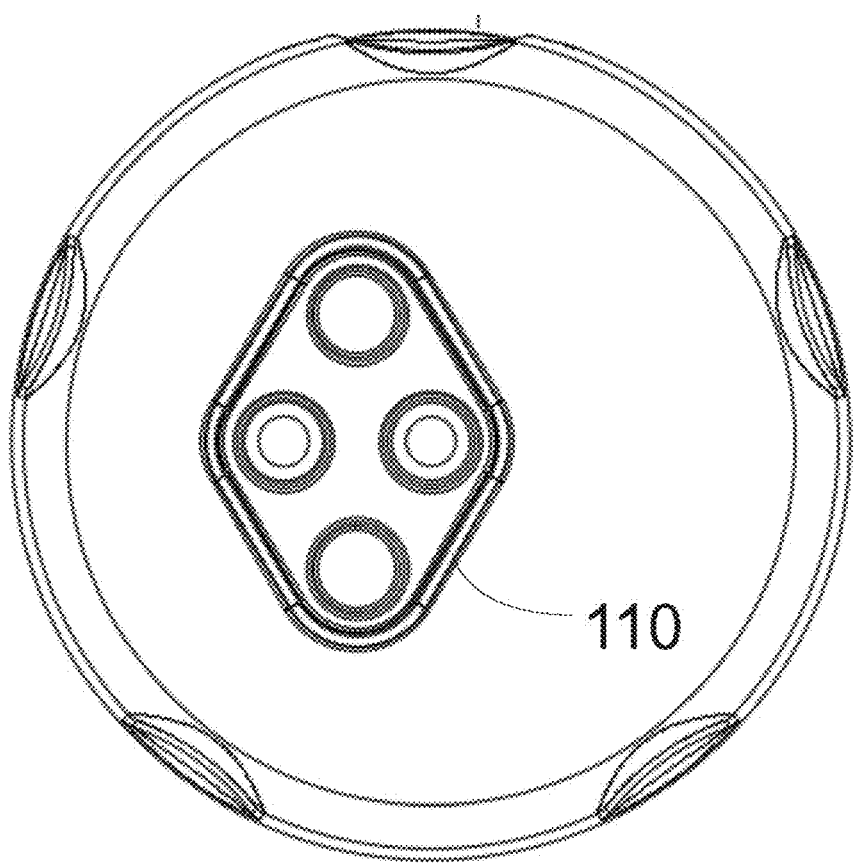
FIG. 9 is a bottom view of FIG. 8.
Figure 10:
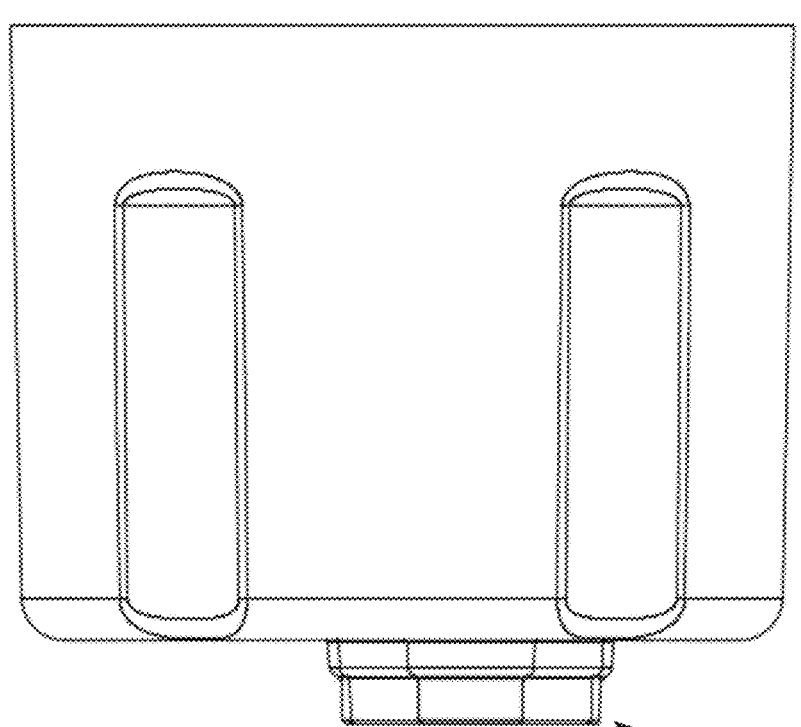
FIG. 10 is a side view of the cupholder showing the attachment member according to an embodiment of the present invention.
Figure 11:
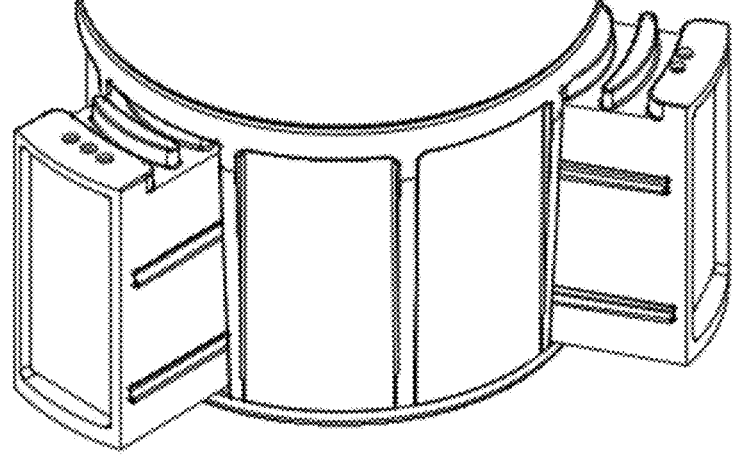
FIG. 11 is a perspective view of the adapter with a mounting spacer according to an embodiment of the present invention.
Figure 12:
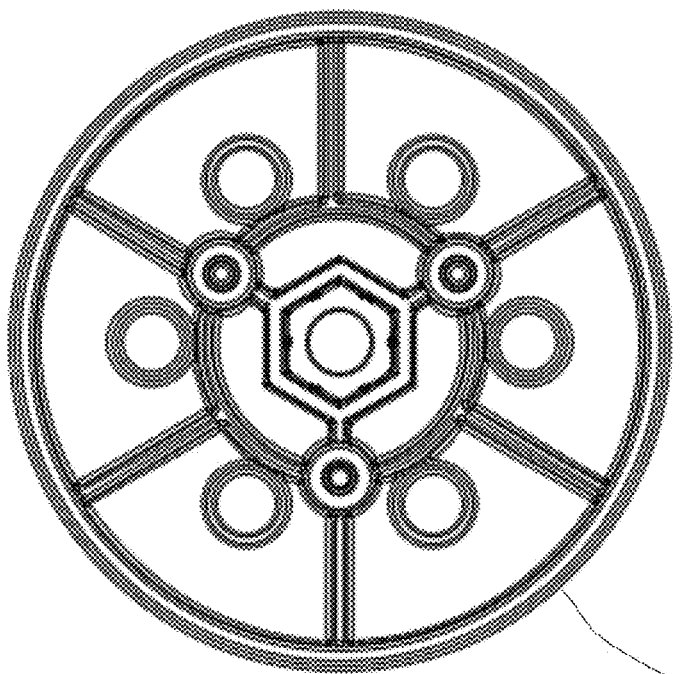
FIG. 12 is a bottom view of the mounting spacer according to an embodiment of the present invention.
Figure 13:
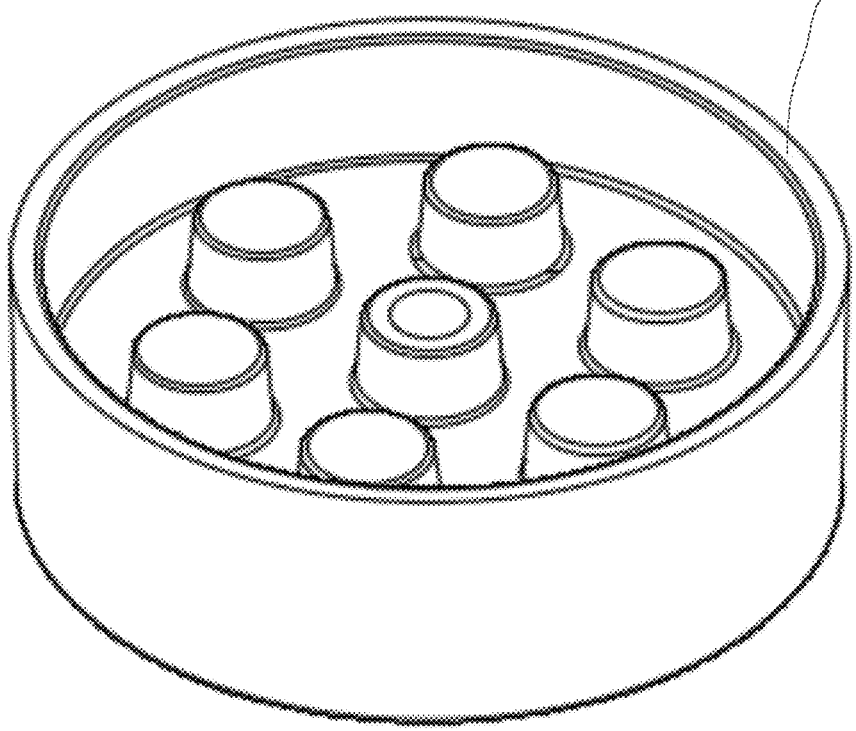
FIG. 13 is a perspective view of FIG. 12.
Figure 14:
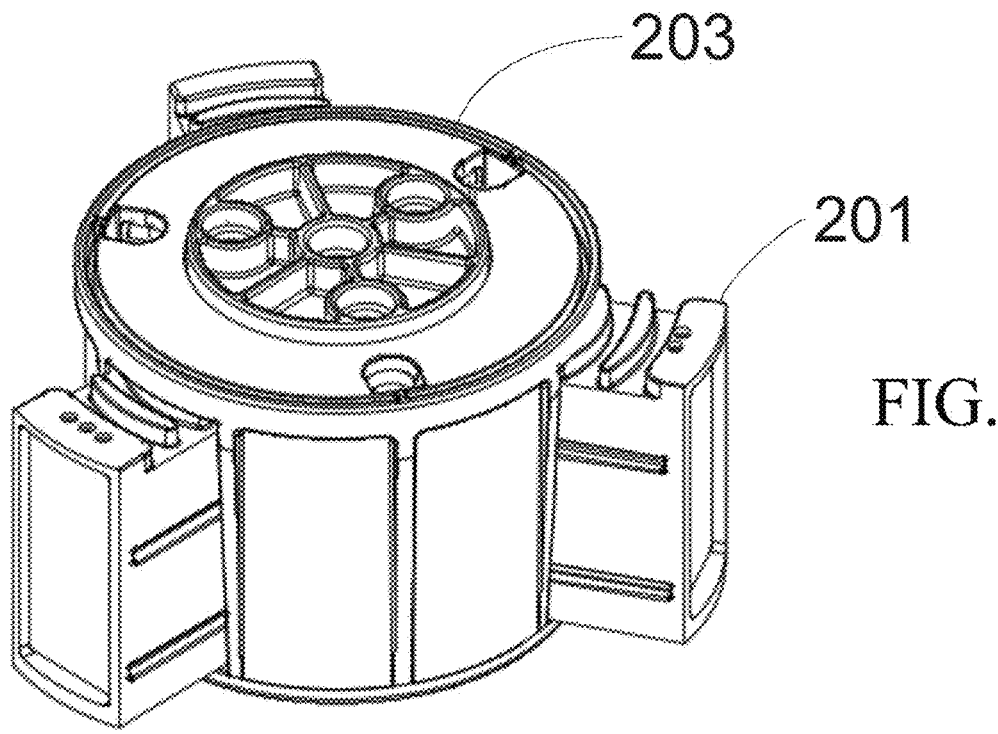
FIG. 14 is a perspective view of the adapter showing the scroll gear according to an embodiment of the present invention.
Figure 15:
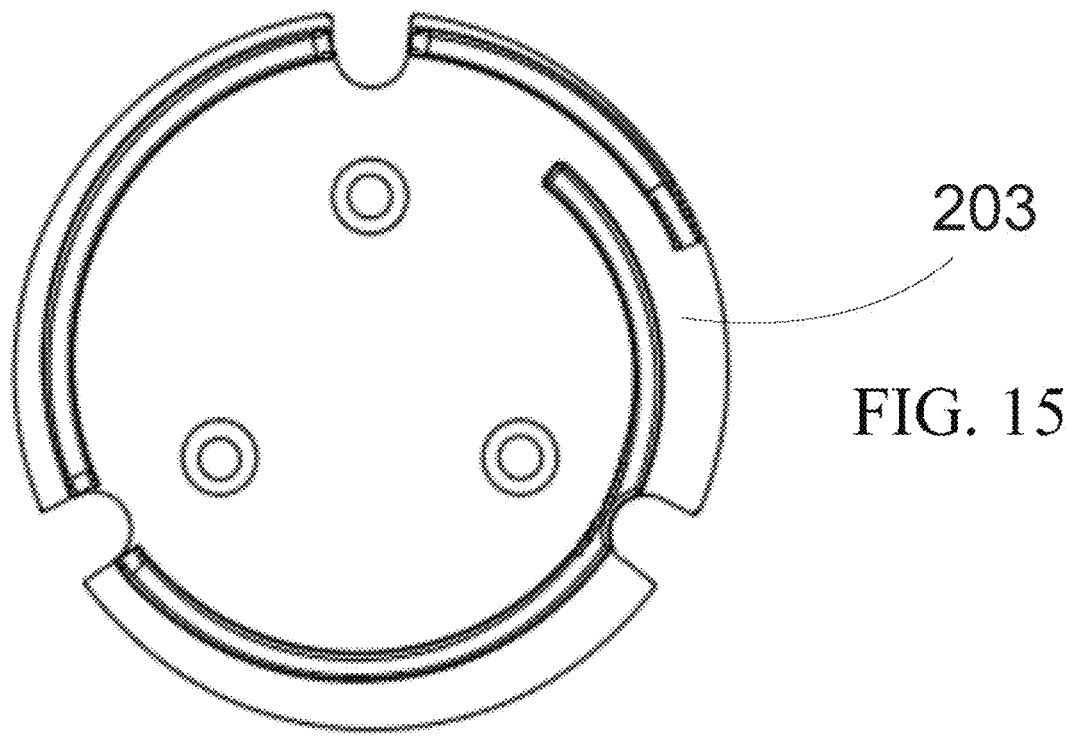
FIG. 15 is a bottom view of the scroll gear showing the scroll thread according to an embodiment of the present invention.
Figure 16:
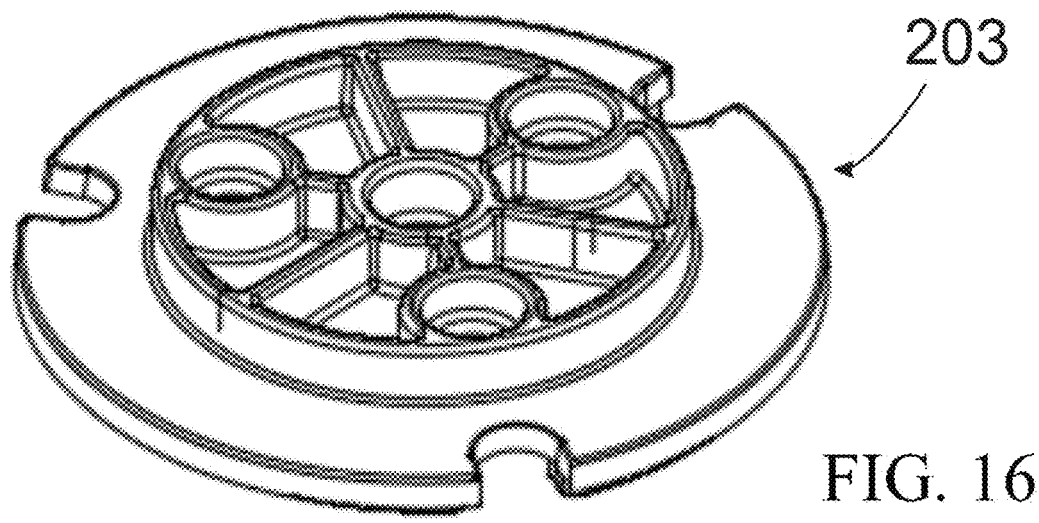
FIG. 16 is a top view of the scroll gear according to an embodiment of the present invention.
Figure 17:
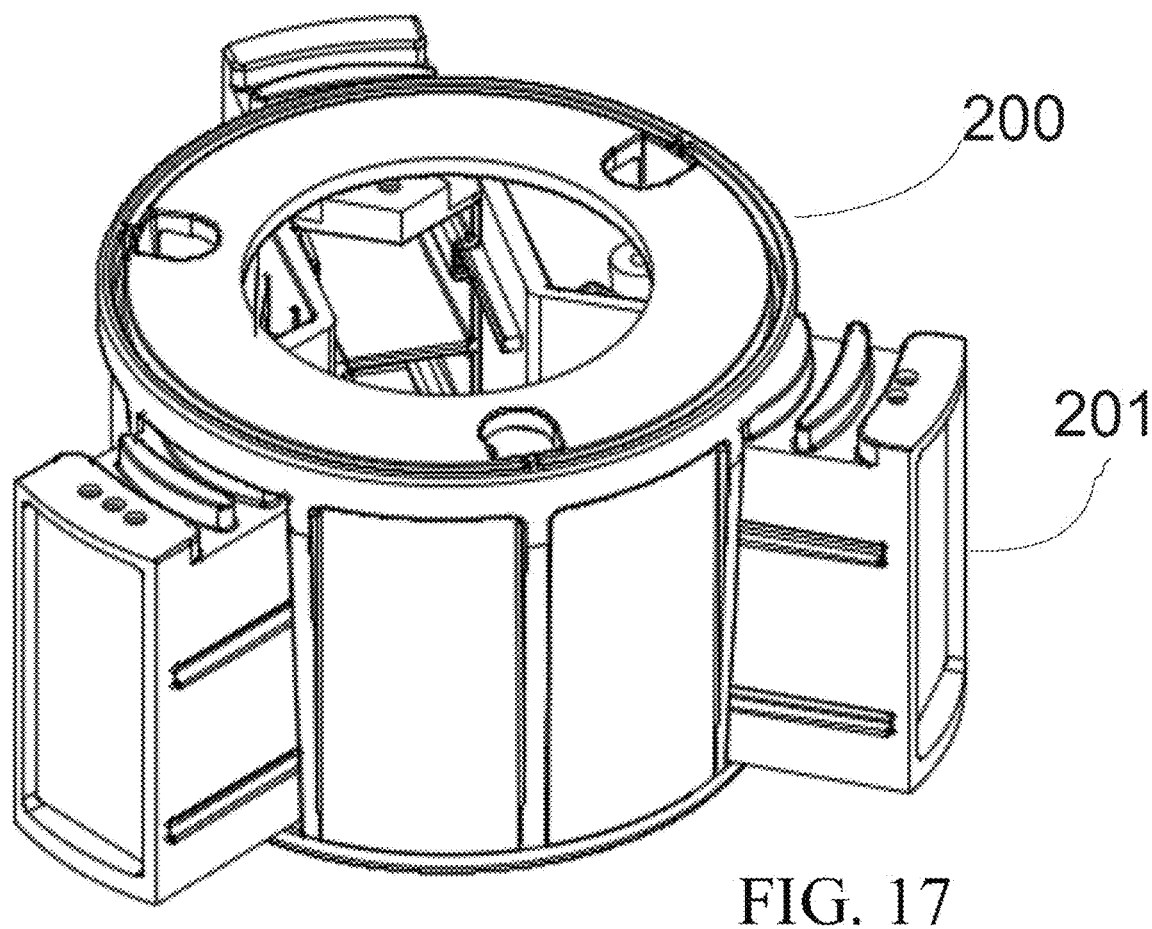
FIG. 17 is a perspective view of the adapter with the legs expanded according to an embodiment of the present invention.
Figure 20:
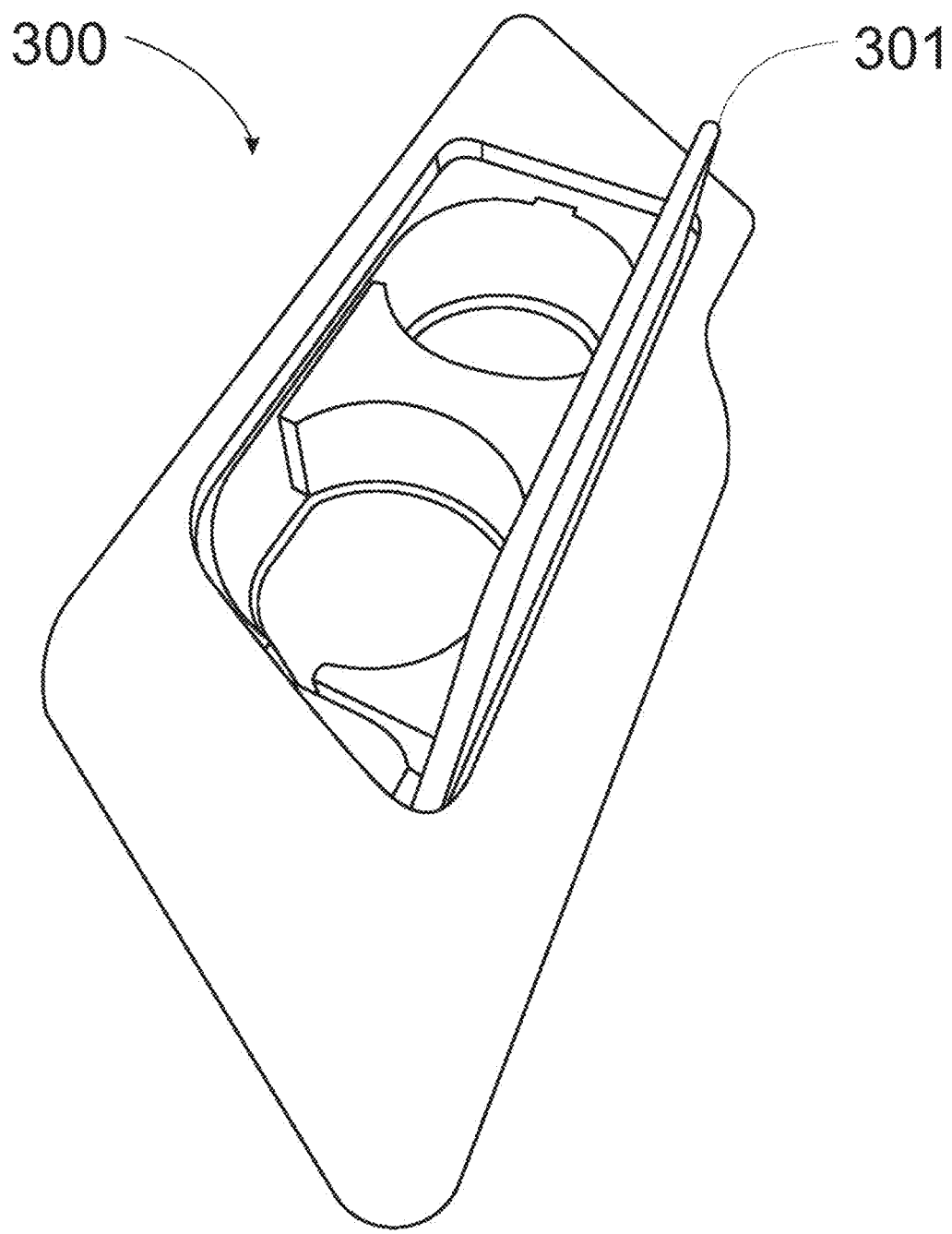
FIG. 20 is an exemplary of a manufacturer-installed cupholder in a vehicle showing a lid partially blocking the cupholder.

As seen in FIG. 20, in some situations, existing cupholders 300 often have an obstruction such as lid 30 that limits the use of some beverage containers from being used. Thus, the cupholder 100 of the present invention may be off-set from the adapter to avoid the obstructions. That is, the cupholder is not symmetrically positioned above the adapter, wherein the axis of the cupholder is not aligned with the axis of the adapter. This functionality permits the adapter 200 to be installed firmly into the vehicle's own cupholder (such as 300) but for the cupholder 100 provided herein to be moved "off to the side" or away from the obstruction or existing component of the vehicle that would otherwise be blocking the cupholder of the present invention. Alternatively, as shown in FIGS. 6 and 7 the cupholder 100 may be installed and aligned symmetrically over the adapter, i.e. not off-set.

Referring now to FIGS. 8-13, various views of the attachment member 110 and spacer 202 are illustrated. The method of attachment between the cupholder 100 and adapter 200 will be described below. In one embodiment, the cupholder 100 includes an attachment member 110 positioned on a bottom surface of the cupholder. In one embodiment, the attachment member 100 includes four mounting holes 111, wherein the holes 111 are configured to align with a number of protrusions 210 provided in spacer 202. The hole/protrusion combination determines how the cupholder 110 sits on the adapter, i.e. centered or off-set. In one embodiment, the attachment member 110 is offset, wherein a mounting hole is positioned in the center of the bottom surface of the cupholder (best seen in FIG. 9). Best seen in FIGS. 11 and 13, in one embodiment, the central protrusion of protrusion 210 includes a hole 211 such that a fastener 500 (FIG. 6) may be used to attach the cupholder to the spacer (and in turn the adapter). When the fastener is used, the other protrusions provide support with their connection to the corresponding mounting holes. In one embodiment, the fastener is a bolt, and a user would need to unscrew the bolt from the bottom of the cupholder 100, lift the cupholder off the spacer 202, and reposition the cupholder such that an "off center" hole on attachment member 110 is positioned over the center protrusion of protrusions 210 of the spacer. This action may enable the large and wide cupholder 100 to be securely positioned upright in the vehicle and not be blocked by the vehicle's console lid, emergency brake, gear shift, or other protruding component as shown in the arrangement of FIGS. 4-5. It should be understood, that although four mounting holes and eight corresponding protrusions are illustrated, the number of mounting holes and/or protrusions may vary.

Referring now to FIGS. 14-19, a mechanism of the adapter enabling the legs to expand and retract is illustrated. As previously mentioned, it is a particular advantage of the present invention to provide an adapter 200 which acts a base for the cupholder of the present invention, wherein the adapter is configured to be positioned within an existing cupholder of a vehicle. In one embodiment, the adapter 200 comprises retractable and expandable legs 201 configured to press against the inside surface of the vehicle's cupholder. In one embodiment, the legs may be retracted or expanded via turning the coupled cupholder of the present invention. Advantageously, this allows the adapter to fit more snugly within the existing cupholder providing stability. It also allows the adapter to be used in different sized cupholders, wherein ultimately the present invention can accommodate a variety of beverage container sizes with a variety of vehicle cupholder sizes. The configurability allows beverage containers, in particular wide beverage containers, to be accommodated that otherwise would not fit in an existing vehicle cupholder, while providing features to ensure stability of the beverage within the cupholder and the adapter within the existing vehicle cupholder.

Figure 18:
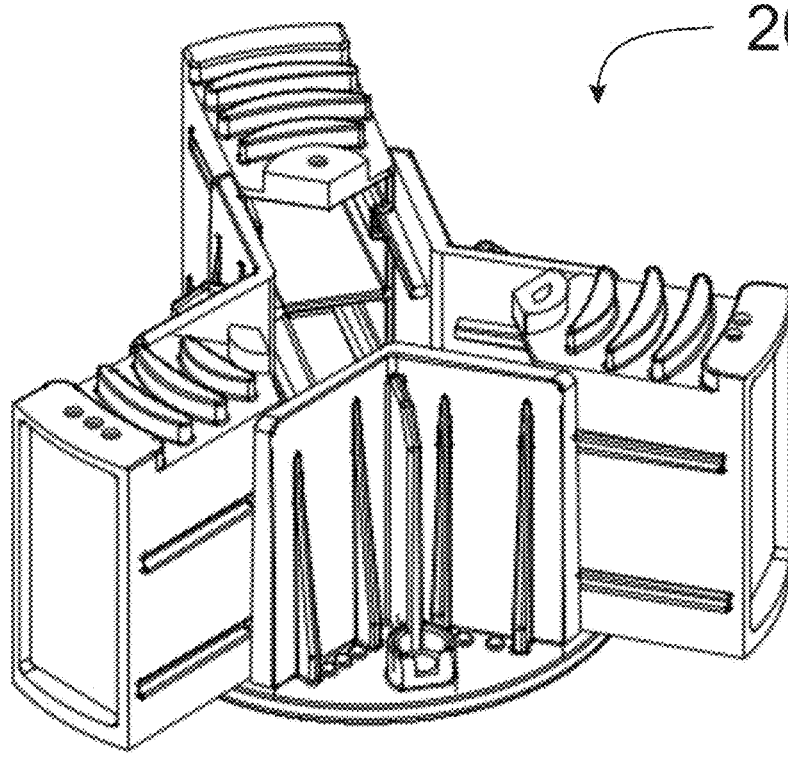
FIG. 18 is a cutaway view of the legs expanded.
Figure 19:
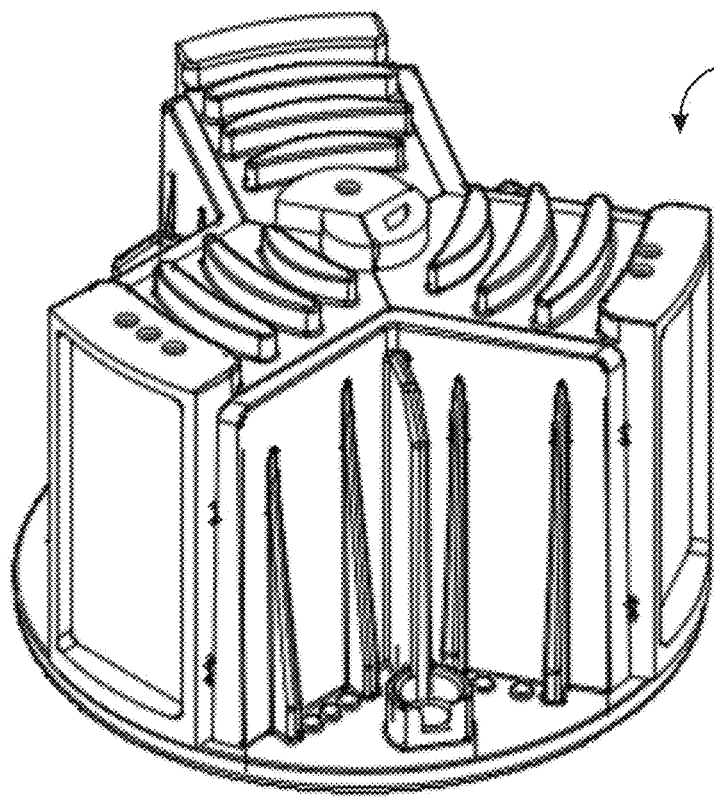
FIG. 19 is a cutaway view of the legs retracted.

In one embodiment, a screw gear 203 is provided on a top portion of the adapter, wherein the top of the legs include gear teeth, such that the spiral-shaped thread engages the gear teeth causing the legs to horizontally expand or contract depending on the direction of the rotation. The adapter and screw gear 203 is attached to the bottom of the spacer, which is attached to the cupholder, such that rotating the cupholder activates the screw gear 203. The fully contracted position 201B is illustrated in FIG. 19, and the fully expanded position 201A is illustrated in FIG. 18. In one embodiment, the legs enable the adapter base to vary in diameter between 2.6" to 3.8".

FIG. 20 shows a manufacturer-installed cupholder 300 in a vehicle showing a lid 301 partially blocking the cupholder. Referring now to FIGS. 5 and 20, as previously mentioned, in this situation the cupholder 100 can be offset from the adapter base 200 such that their axes are not aligned. In this way, the cupholder 100 can avoid the obstruction of the lid 301.

Figure 21:
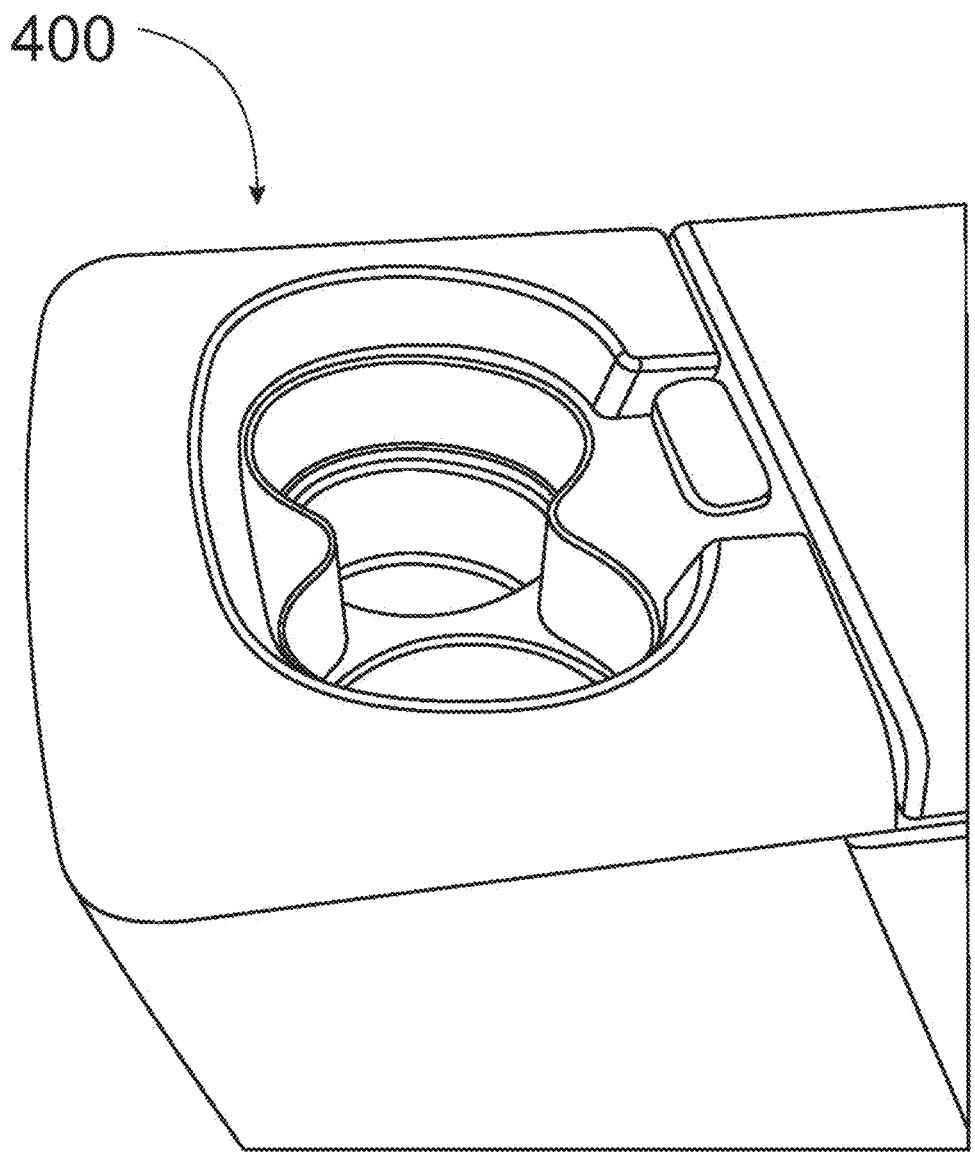
FIG. 21 is an exemplary of a manufacturer-installed deep cupholder in a vehicle.
Figure 22:
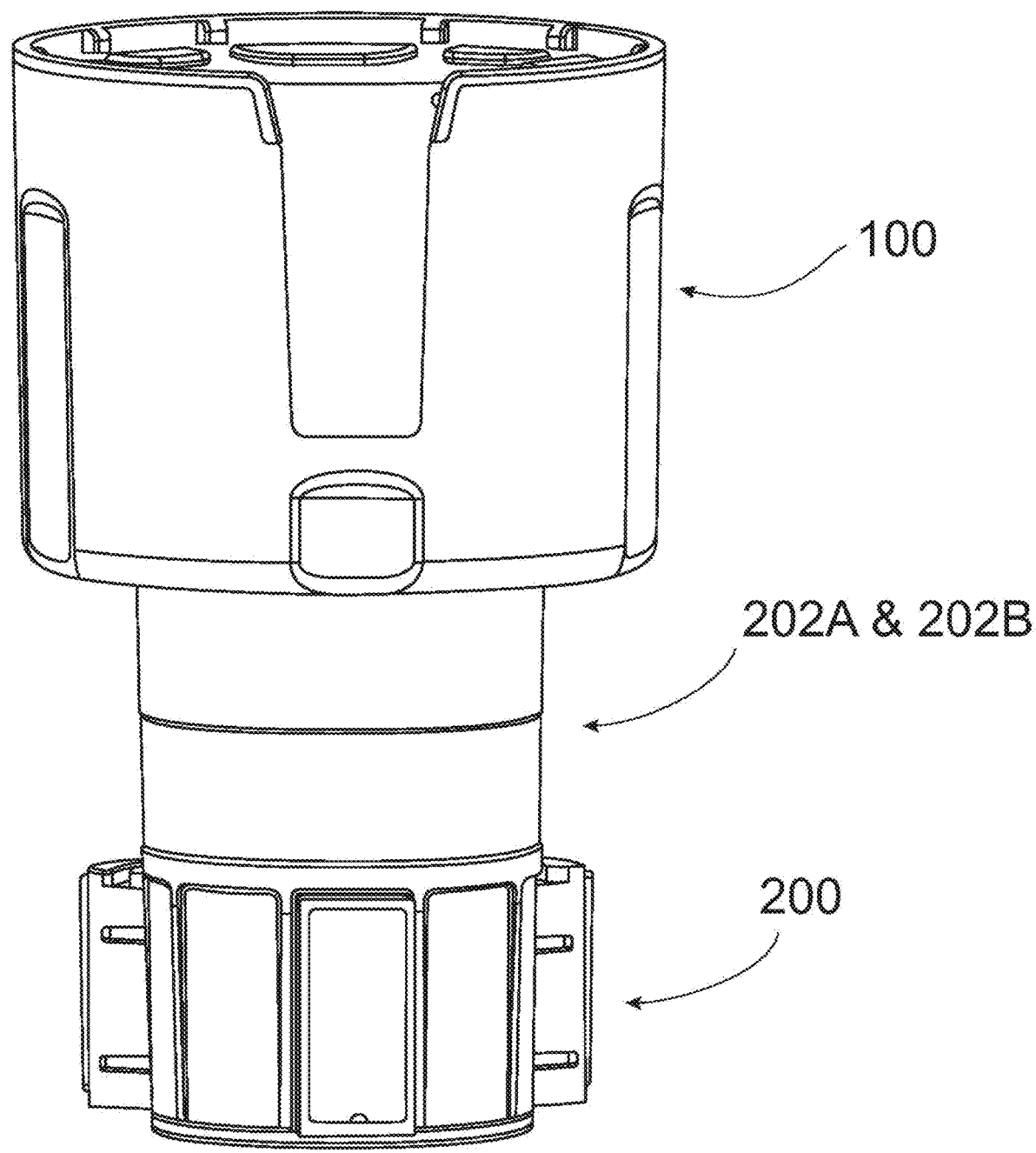
FIG. 22 is a perspective view of the present invention with two spacers installed according to an embodiment of the present invention.
Figure 23:
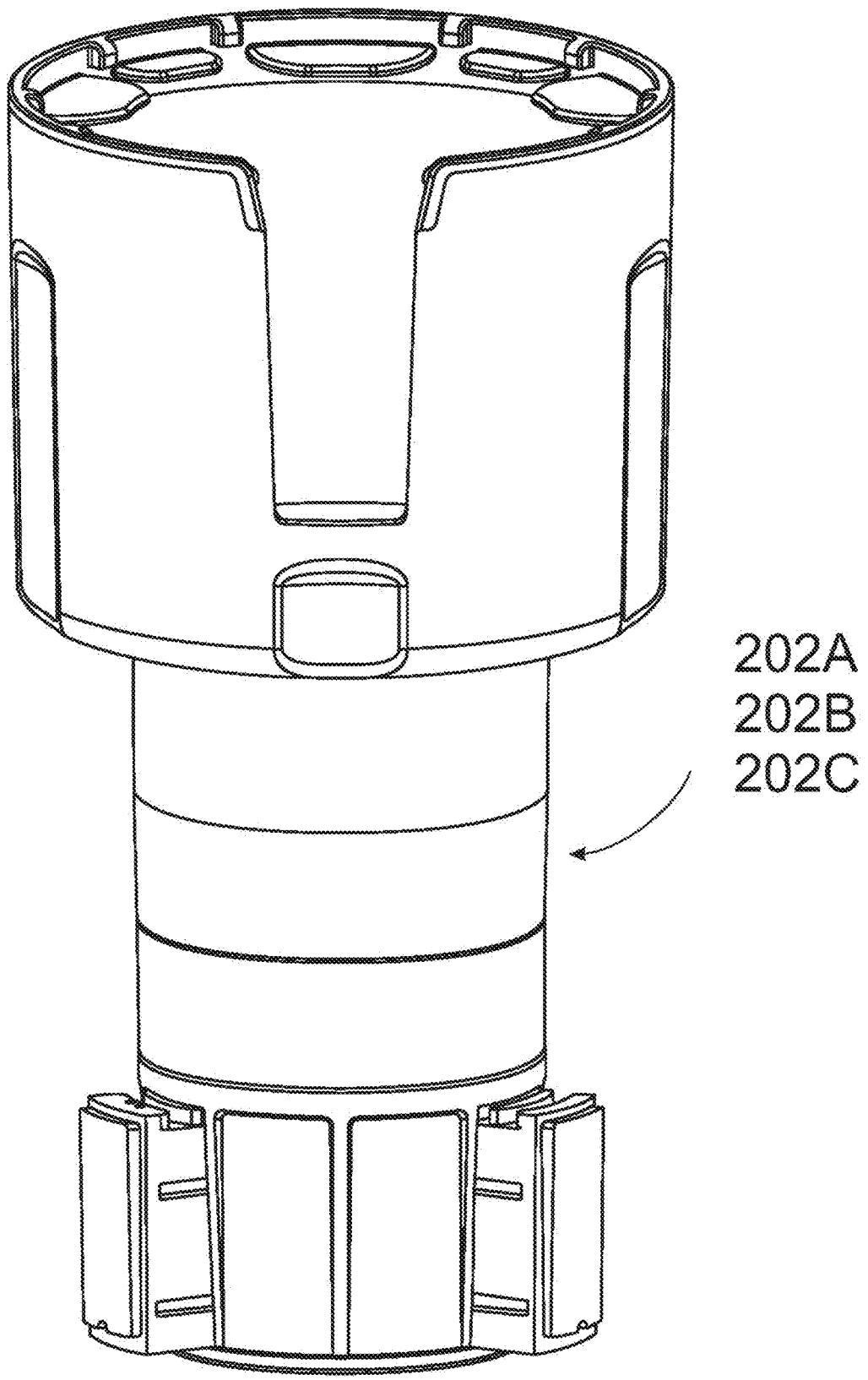
FIG. 23 is a perspective view of the present invention with three spacers installed according to an embodiment of the present invention.
Figure 24:
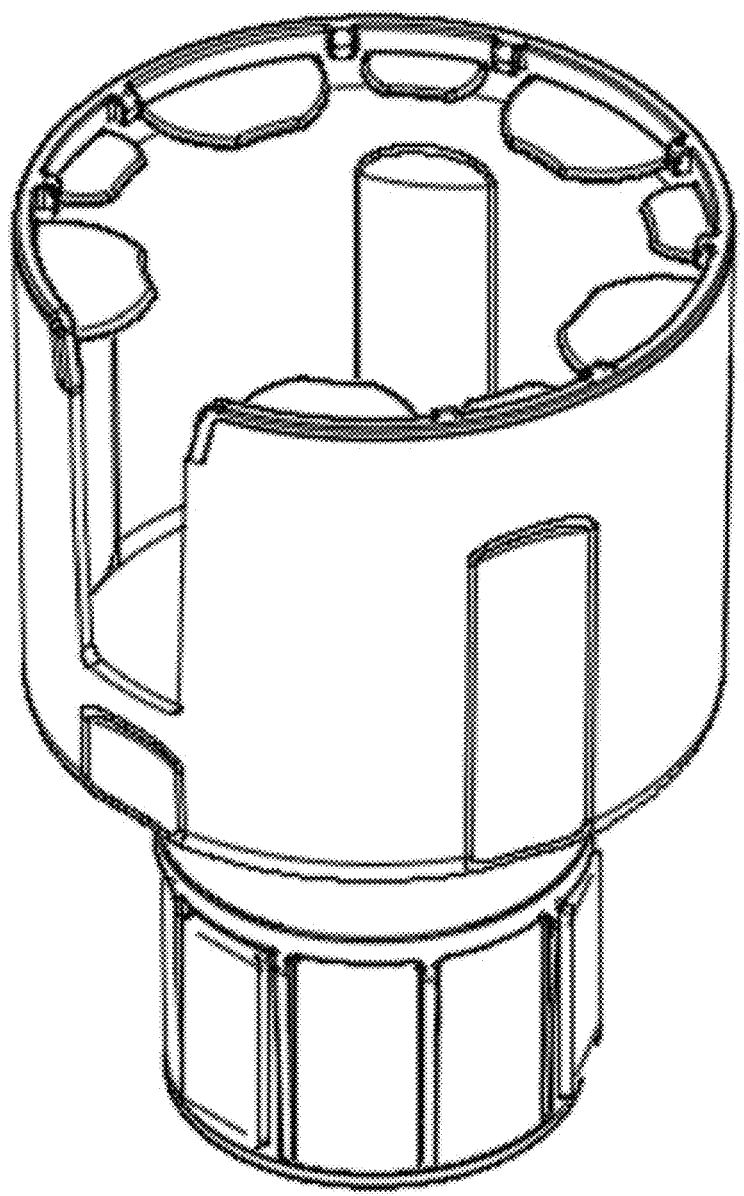
FIG. 24 is a perspective view of the present invention with one spacer installed according to an embodiment of the present invention.

FIG. 21 shows a manufacturer-installed deep cupholder 400 in a vehicle. Referring now to FIGS. 21-24, when faced with a deep cupholder 400, more spacers can be used to extend the distance between the adapter base 200 and cupholder 100. FIG. 22 shows two spacers 202A and 202B installed. Likewise, FIG. 23 shows three spacers 202A, 202B, and 202C used. In one embodiment, the spacers are attached to the adjacent spacer via mechanical hardware, such a screw or bolt. In some embodiments, one screw or bolt may be used to join the multiple spacers. The number of spacers can be selected depending on the depth of the existing cupholder.

As one skilled in the art can appreciate, the present invention is adaptable for a variety of existing cupholder situations. Only a few exemplary existing cupholders were shown, but it should be understood that the present invention can be modified to accommodate approximately all of the existing cupholders on the market in a vehicle, wherein the vehicle includes cars, trucks, buses, golf carts, etc. while providing stability for the beverage.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For instance, although a screw gear is used to facilitate the functionality of the expandable and retractable legs, other methods may be used.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A cupholder adapter configured for use with an existing cupholder on a vehicle, the cupholder adapter comprising:
    a cylindrical cupholder having a hollow internal volume;
    a collar attached to a top portion of the cylindrical cupholder, wherein the collar includes a plurality of tabs extending perpendicularly into the hollow internal volume, wherein the plurality of tabs comprises tabs of varying lengths and widths;
    an adapter base coupled to the cylindrical cupholder, wherein the adapter base includes a plurality of legs configured to expand and retract such that the diameter of the adapter base is configured to expand from a minimum diameter to a maximum diameter;
    an attachment member positioned on a bottom surface of the cylindrical cupholder, wherein the attachment member enables the coupling of the adapter base and the cylindrical cupholder via a mounting spacer attached to the adapter base; and,
    wherein the attachment member comprises a number of mounting holes and the mounting spacer comprises a number of protrusions including a central protrusion having a hole, wherein a mounting hole of the number of mounting holes is configured to align with the central protrusion such that a fastener can extend through the mounting hole and the hole of the central protrusion.

2. The cupholder adapter of claim 1, wherein the plurality of legs are configured to expand and retract via rotation of the cupholder.

3. The cupholder adapter of claim 1, wherein the cylindrical cupholder is configured to be coupled to the adapter base in a variety of configurations including at least (a) the cylindrical cupholder's axis is aligned with the adapter base's axis; and (b) the cylindrical cupholder's axis is not aligned with the adapter base's axis.

4. The cupholder adapter of claim 1, wherein the number of mounting holes of the attachment member enable multiple configurations of the cylindrical cupholder in relation to the adapter base including an aligned configuration and off-set configuration.

5. The cupholder adapter of claim 1, further comprising at least one spacer positioned between the cylindrical cupholder and the adapter base.

6. The cupholder adapter of claim 2, wherein a screw gear is provided to enable the movement of the plurality of legs via rotation.

7. The cupholder adapter of claim 1, wherein the minimum diameter is 2.6 inches and the maximum diameter is 3.8 inches.

* * * * *